United States Patent Office 3,681,091
Patented Aug. 1, 1972

1

3,681,091

METHOD OF PRESERVING FOOD MATERIALS, FOOD PRODUCT RESULTING THEREFROM, AND PRESERVATIVE COMPOSITION

Willibald F. Kohl, Nanuet, N.Y., and Rudolph H. Ellinger, Chagrin Falls, Ohio, assignors to Stauffer Chemical Company, New York, N.Y.

No Drawing. Continuation-in-part of applications Ser. No. 605,597 and Ser. No. 606,598, both Jan. 3, 1967. This application May 6, 1970, Ser. No. 35,270
Int. Cl. A23b *1/00, 7/00;* A23l *3/34*
U.S. Cl. 99—150 17 Claims

ABSTRACT OF THE DISCLOSURE

Preserving food material, especially liquids such as apple cider, against microbial spoilage for extended periods of time by incorporating 1% of a medium chain length polyphosphate, e.g., average chain length of 25, in the food material which is to be preserved.

CROSS-REFERENCE TO RELATED APPLICATIONS

This application is a continuation-in-part of prior and co-pending applications Ser. No. 606,597, filed Jan. 3, 1967, and Ser. No. 606,598, filed Jan. 3, 1967, of the same inventors, both now abandoned.

The present invention relates to the use of certain polyphosphates as microbial agents, and more particularly, it relates to retarding and eliminating spoilage in a wide variety of perishable food materials which are susceptible to fungal and bacterial attack. Still more particularly, it relates to the application of certain polyphosphates to perishable food materials in order to preserve such materials against deterioration due to the action of fungi including molds as well as yeasts and bacteria.

The application of polyphosphates, including tetrasodium pyrophosphate, sodium tripolyphosphate, and sodium hexametaphosphate is known in the art of preserving certain meat and fish products. While the application of such phosphate materials in meat and fish has provided satisfactory solutions to the problems including color and fat retention, serious problems of spoilage of these and other food materials of vegetable as well as animal origin are still known to exist. Therefore, it is the principal object of the present invention to overcome and eliminate the shortcomings inherent in the prior art and to provide a method for preserving food materials against spoilage.

In accordance with the present invention, we have now discovered that nutrient containing materials, e.g., food materials of vegetable as well as animal origin can be preserved against microbial action of deleterious fungi, including molds as well as yeast and bacteria in an unexpectedly, highly effective manner by the incorporation therein of a small but effective amount of a substance comprising a medium chain length polymeric phosphate of the type::

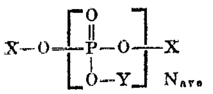

wherein X represents hydrogen or an alkali metal including ammonium, which is preferably sodium or potassium; and Y represents an alkali metal including ammonium, which is preferably sodium or potassium; $N_{ave}$ represents an average chain length between about not less than 14 and about 100. A preferred range comprises polyphosphates having $N_{ave}$ between about 16 and 37. The term "average chain length" or "$N_{ave}$" as employed herein, is intended to represent a statistical average chain length or indication of the number of recurring units linked together comprising the anionic species. Such an average is determined by titration as described in Van Wazer et al., Anal. Chem. 26 1755–9 (1954).

In the practice of the present invention, it has now been found that the medium chain length polyphosphates as described herein exhibit unexpectedly superior performance as a microbial inhibitor in food preparations when compared with orthophosphates, pyrophosphates and hexametaphosphates employed in the past. It has also been found that the very long chain polyphosphates, e.g., average chain lengths of 1000–2000 are unsuitable for incorporating in certain food preparations because of solubility and viscosity considerations. There is also evidence that the long chain materials have decreased efficacy as compared with the medium chain length polyphosphates.

The terms "metaphosphate," "hexametaphosphate," and "polymeric phosphates" when employed in conjunction with examples illustrating hexametaphosphates as employed herein and in the prior art should be distinguished from the medium chain length polymeric phosphates having the $N_{ave}$ as defined herein on the basis that such prior usage refers to $N_{ave}$ from about 6 to a maximum of 12 when determined by the method of Van Wazer hereinbefore referenced.

The term "microbial" as employed herein pertains to fungi, including mold and yeast, as well as bacteria. The inhibition of spoilage may be due to microbiostatic as well as microbiocidal action.

In general, the medium chain length polyphosphates inhibit microbial growth when applied to any suitable locus where inhibition is desired. Since these materials are generally recognized as safe (GRAS) for human consumption, a preferred application of this invention is in retarding spoilage of food materials.

Suitable food materials which are retarded from spoilage by application of medium chain length polyphosphates include a wide range of solid as well as fluid food preparations. Fruits and vegetables illustrate typical solid foods which are benefited by surface application of these polyphosphates. It is pointed out, however, that potatoes are specifically excepted from this group as they do not appear to benefit by such treatment.

Food materials which are fluid during processing appear to be more readily retarded from microbial spoilage by application of medium chain length polyphosphates than solid foods. Such materials include liquids such as fruit and vegetable juices or fermented derivative thereof, beer, wine, animal or vegetable broths or extracts. The greatest efficacy has been attained in clear juices such as apple juices and apple ciders. Fluids also include finely divided or colloidal foodstuffs, whips and other so-called convenience foods as well as materials which are fluid during preparation such as jellies and jams. The polyphosphates can be readily incorporated in fluids by simple admixture or blending techniques known in the art. Solid foods can be treated by well known techniques, e.g., dipping, flooding and spraying. The medium chain length polyphosphates can also be incorporated in ice employed to preserve food materials.

In general, one skilled in this art would be able to readily determine an "effective amount" of medium chain length polyphosphates for a particular application. Broadly effective amounts will vary between about 0.1 and about 5 percent on a weight basis. However, a preferred range where the polyphosphates are blended into a fluid is between about 0.1 and about 2% and most preferably 0.5 and about 1.0% on a weight basis. When dipping, flooding or spraying techniques are employed, the preferred concentration of solution is between about 5 and about 20 weight percent.

It has also been discovered that the medium chain length polyphosphates exhibit superior taste appeal when compared with known preservatives of comparable efficacy such as alkali metal benzoates, sorbates or propionates, in particular the sodium or potassium salts of these materials. In particular, apple cider preserved with combinations of benzoates or sorbates with medium chain length polyphosphates exhibited superior taste appeal relative to apple ciders preserved with benzoates or sorbates, alone. Taking into consideration both efficacy and taste, the combination of polyphosphate and sorbates or benzoates is preferred for the preservation of edible fluids, in particular. Combined concentrations of between about 0.2 and about 2 and most preferably 0.5 to 1.0% on a weight basis are employed.

When a combination additive such as sodium benzoate or potassium sorbate or sodium propionate and sodium polyphosphate ($N_{ave}$ 25) is prepared as an article of commerce, the ratio of the benzoate, sorbate or propionate salt to polyphosphate is preferably between about 1:20 to 20:1 and most preferably between about 2:1 to 1:2 on a weight basis.

It is well known that factors other than chemical additives influence the microbial deterioration of food materials. Such factors include, but may not be limited to, incubation time, temperature, pressure, and pH. In addition, it appears that the particle size or condition of edible fluids, e.g., the presence of pulpy material, moisture conditions and the presence of materials, e.g., enzymes which may contribute to breakdown of polyphosphates influence overall performance of these and other additives.

Having thus described the invention in general terms, reference is now made to specific examples which are not to be construed as unduly limiting thereof.

EXAMPLE 1

Process apple juice was used in this example as a medium to study fungistatic effects of polyphosphates. A series of flasks were filled with such apple juice.

The following polyphosphates were added to the juice to give concentrations of 1% by weight.

(1) sodium hexametaphosphate
(2) sodium polyphosphate ($N_{ave}$ 35)
(3) potassium metaphosphate ($N_{ave}$ 1000)
(4) potassium polymetaphosphate ($N_{ave}$ 1700)

One group of flasks were kept at room temperature (25° C.) exposed to the atmosphere, without covering the flasks, so that natural contamination could occur and lead to spoilage of the juice. Spoilage was observed in the controls which had no chemical additive.

Another group of flasks was inoculated with a suspension of yeast cells and was incubated at 30° C.

After 1 week, both groups of flasks containing polyphosphates shows a well preserved apple juice, whereas in the respective controls yeast fermentation started after about 12 hours. The controls without purposely added inoculum, but which had been exposed to the atmosphere, also showed growth of molds.

From samples of apple juice to which 1% of polyphosphates had been added, anad which were inoculated with yeast, fractions were pipetted out and transferred into fresh apple juice, which contained no preservative. No yeast grew in the fresh media, and thus the polyphosphates appear to have fungicidal effects.

EXAMPLE 2

In another experiment employing apple juice as the medium of microbiological spoilage, the effects of different inorganic phosphates were tested against a variety of fungi:

(a) *Aspergillus niger*
(b) *Penicillium italicum*
(c) Wild yeast isolated from spoiled juice
(d) baker's yeast, *Saccharomyces cervisiae*
(e) a blue-green mold, isolated from spoiled apples The following phosphates were added to portions of apple juice to a final concentration of 1%.

(1) disodium orthophosphate
(2) sodium acid pyrophosphate
(3) tetrasodium pyrophosphate
(4) sodium tripolyphosphate
(5) sodium hexametaphosphate ($N_{ave}$ 9)
(6) sodium polyphosphate ($N_{ave}$ 18)
(7) sodium polyphosphate ($N_{ave}$ 20)
(8) sodium polyphosphate ($N_{ave}$ 31)
(9) sodium polyphosphate ($N_{ave}$ 35)

Inoculation of portions of the juice containing said phosphates was carried out by use of suspensions of spores from the molds, or suspensions of cells of yeasts, respectively. Incubation temperature was 25° C. which condition assured good growth facilities as was seen in the controls which contained no phosphates, and in which heavy growth could be observed from 1–2 days after inoculation.

No inhibition was observed in the samples of juice to which had been added orthophosphate. It was further observed that tetrasodium pyrophosphate and tripolyphosphate acted as slight inhibitors for fungal growth. Especially good inhibition was achieved by the use of sodium hexametaphosphate ($N_{ave}$ 9) and of sodium polyphosphate 18–35). The latter group acted as chemical preservatives in foods, and preserved the juices to which spores of molds or yeast cells had been added for up to 6 weeks.

EXAMPLE 3

In this experiment, a liquid medium containing 1.5% malt extract and 3% dextrose was applied to study the effects of different phosphates upon molds.

The following molds were tested:

(a) *Aspergillus niger*
(b) *Penicillium italicum*
(c) a green mold isolated from rotten potatoes
(d) a yellow mold isolated from rotten potatoes A series of phosphates was tested whereby these chemicals were added to the nutrient growth medium in amounts yielding a final concentration of 1%.

(1) disodium orthophosphate
(2) sodium acid pyrophosphate
(3) tetrasodium pyrophosphate
(4) sodium tripolyphosphate
(5) sodium hexametaphosphate ($N_{ave}$ 9)
(6) sodium polyphosphate ($N_{ave}$ 18)
(7) sodium polyphosphate ($N_{ave}$ 20)
(8) sodium polyphosphate ($N_{ave}$ 31)
(9) sodium polyphosphate ($N_{ave}$ 35)

Inoculation was carried out with suspension of spores of the above mentioned molds. Temperature of incubation was 30° C. The flasks which contained disodium orthophosphate or no preserving chemical, which were used as controls, started to show visible signs of growth of molds overnight.

Sodium acid pyrophosphate gave no significant inhibitory effect whereas tetrasodium pyrophosphate and sodium tripolyphosphate were useful inhibitors especially for the two molds isolated from potatoes, which respective samples did not show growth of mold for up to 4 weeks. Surprisingly, better inhibition was found in the longer chain polyphosphates. All sodium polyphosphates (9–35) as tested in this experiment prevented the growth of *Asper-* gillus niger, Penicillium italicum, and of two molds isolated from rotten potatoes.

EXAMPLE 4

The high polymerized potassium metaphosphates with average chain lengths between 1000 and 2000 were included in this experiment to determine fungistatic properties of these chemical in comparison with sodium polyphosphates and with previously known preservatives.

Since the solubility of the high polymerized potassium metaphosphates is very low in aqueous media, they were solubilized by sodium salts. In particular, sodium hexametaphosphate can be used to solubilize potassium metaphosphate, thus giving a system of a combined action of two fungistatic acting chemicals. The test medium in which the preserving chemicals were tested contained 1.5% malt extract and 3% dextrose and was enriched with 0.5% yeast extract to supply growth factors and vitamins, together with trace minerals.

The chemicals to be tested were added to portions of this broth in amounts to give a concentration of 0.5% and in a few cases of 0.25%. Inoculation was carried out with suspensions of spores of the mold *Aspergillus niger* and with cells of baker'syeast, *Saccharomyces cerevisiae*, respectively. A series of flasks containing no preserving chemicals was prepared and used as control for the growth studies.

All flasks were incubated at 30° C.

The tested chemicals in the experiment were:

(1) sodium hexametaphosphate
(2) potassium metaphosphate ca. 1000 chain length, dissolved in sodium hexametaphosphate
(3) potassium sorbate
(4) sodium benzoate
(5) sodium propionate After 4 days of incubation, yeast grew in the controls and in the flasks containing sodium benzoate or sodium propionate.

After 5 days of incubation turbidity readings were carried out with the flasks which had been inoculated with yeast. For every single experimental condition (a certain chemical additive) ten parallel flasks had been prepared, so that the turbidity readings could be averaged. Based on the turbidity given by the control assigned a value of 100% growth, the following growth figures were obtained:

Percent growth of yeast

| With— | Percent |
|---|---|
| 0.5%— | |
| Potassium sorbate | 4 |
| Sodium benzoate | 15 |
| Sodium propionate | 64 |
| Sodium hexametaphosphate | 1 |
| Sodium polyphosphate (av. chain length 35) | 0 |
| Potassium metaphosphate plus 0.25% sodium hexametaphosphate | 0 |
| 0.25% potassium metaphosphate plus 0.12% sodium hexametaphosphate | 0 |

The part of flasks which had been inoculated with spores of *Aspergillus niger* was evaluated after 10 days of incubation. Heavy growth of mold was then observed in the controls and also in the samples with potassium sorbate, sodium benzoate, or sodium propionate. Samples with sodium hexametaphosphate, sodium polyphosphate ($N_{ave}$ 35) or potassium metaphosphate, prevented the growth of *Aspergillus niger* under the same conditions.

EXAMPLE 5

Inhibition of the growth of the mold *Aspergillus niger* was studied with malt extract as the growth medium. Inhibitory effects of different polyphosphates were compared with the effects of the salts of known fungistatic preservatives.

Thus, to portions of malt extract the following chemicals were added in such an amount that they yielded a concentration of 1%.

(1) sodium pyrophosphate, as a 50:50 mixture of sodium acid pyrophosphate and tetrasodium pyrophosphate
(2) sodium tripolyphosphate, pH adjusted with $H_3PO_4$ to 6.0
(3) sodium hexametaphosphate
(4) long chain sodium polyphosphate
(5) potassium sorbate
(6) sodium benzoate
(7) Sodium propionate The flasks containing the malt extract and the given chemicals were then inoculated with a suspension of spores of the mold *Aspergillus niger*.

A series of flasks was also prepared which contained no preserving chemicals but also was inoculated with *Aspergillus niger* and served as controls.

All the flasks were then incubated at 30° C. for 4 days. After this time the controls showed heavy mold growth. A thick layer of mycelium had been formed, and heavy black sporulation appeared in the controls. The known preservatives propionate, benzoate, and sorbate showed also some growth of mycelium of the mold *Aspergillus niger*, although the amount of mycelium formed was less than in the controls, proving some inhibition.

A slight inhibition shown by the decreased amount of mycelium, as compared to the controls, was also exerted by pyrophosphate or tripolyphosphate. In the samples containing either sodium hexametaphosphate or a long chain polyphosphate, however, growth was completely inhibited. The malt extract in these cases was completely clear. None of spores of *Aspergillus niger* which had been introduced by a heavy inoculation had sporulated and grown.

EXAMPLE 6

The effects of different polyphosphates upon the growth of two molds, *Aspergillus niger* and a Penicillium species, as also against yeast, *Saccharomyces cerevisiae* were tested.

The mold *Aspergillus niger* had been grown on potato dextrose agar. Therefrom spores were washed off with sterile water yielding a dark colored suspension.

Another mold, from the species Penicillium had been isolated from a moldy lemon. In a similar way to that described above, a suspension of spores was prepared which was used as inoculum in the test.

The third microorganism used in this experiment was baker's yeast, *Saccharomyces cerevisiae*.

The test medium for microbiological growth contained 1.5% malt extract, 3.0% corn sugar, 0.3% yeast extract, and 0.2% peptone. Portions of this medium were filled into flasks. Different polyphosphates were then added to a concentration of 1% in the final medium.

The flasks were inoculated with portions of 1 ml. of:

(a) a suspension of spores of *Aspergillus niger*
(b) a suspension of spores of a Penicillium species
(c) a suspension of cells of yeasts Incubation was carried out at 30° C. for 2 weeks.

After 2 weeks *Aspergillus niger* had formed heavy mycelia and was sporulating in all controls without polyphosphates as well as in the samples containing tetrasodium or tetrapotassium pyrophosphate. In flasks containing potassium tripolyphosphate, sodium hexametaphosphate, or sodium polyphosphates $N_{ave}$ 15, 18, 20, 31, 35, growth of mold was completely inhibited.

Also after 2 weeks of incubation, the growth of the Penicillium species was inhibited by potassium tripolyphosphate, sodium hexametaphosphate, or sodium polyphosphates $N_{ave}$ 15, 18, 20, 31, 35.

Similar results were obtained with yeast which had heavily grown in the controls. Polyphosphates with average chain lengths 3, 11, 15, 18, 20, 31, 35 prevented the growth of yeast.

EXAMPLE 7

Unpasteurized apple cider was filled into a series of flasks. Different polyphosphates were added to some of them. Another group of flasks was kept without additives. All flasks were stored at room temperature (25° C.) without any further precautions to spoilage.

TABLE I
[Results after 6 weeks' storage]

| Additive | Concentration of additive in cider, percent | Color of cider | Microbiological spoilage |
|---|---|---|---|
| Sodium tripolyphosphate. | 0.5 or 1 | Dark brown | Moldy. |
| Sodium polyphosphate ($N_{ave}$ 15). | 0.5 or 1 | Golden | Unspoiled. |
| Sodium polyphosphate ($N_{ave}$ 18). | 0.5 or 1 | do | Do. |
| Sodium polyphosphate ($N_{ave}$ 20). | 0.5 or 1 | do | Do. |
| Sodium polyphosphate ($N_{ave}$ 31). | 0.5 or 1 | do | Do. |
| Sodium polyphosphate ($N_{ave}$ 35). | 0.5 or 1 | do | Do. |
| No additive (in 5 flasks). | | Dark brown | Moldy on surface and yeast growth on bottom of flasks. |

NOTE.—The number given in parentheses with sodium polyphosphates refers to the analytically established average chain length.

EXAMPLE 8

Fresh grapes were ground up and pressed through cloth to obtain grape juice. No attempt was made to work under sterile conditions or to get rid of the naturally occurring yeasts on the grapes. On the contrary, it was observed that some grapes had been starting to rot at the stem end. So it was assured that natural spoilage microorganisms were in the juice.

Portions of this grape juice were filled into flasks to which different polyphosphates were added. All flasks were stored without any further precautions towards spoilage, at 25° C.

After 7 days of storage samples with 2.5% sodium polyphosphate, average chain lengths 15 to 35, were well preserved and did not show any signs of fermentation by yeast or of growth of molds.

Samples to which were added sodium chloride, or tap water, or which contained no additive, and the samples which served as controls spoiled after 2 days of storage by yeast fermentation and also by growth of molds.

EXAMPLE 9

Processed pineapple juice was taken out of the cans, filled into a series of flasks and kept exposed to natural contamination by mold spores and yeasts present in the atmosphere, especially of a laboratory in which moldy fruits had been previously handled.

To portions of this pineapple juice different polyphosphates were added giving concentrations of 1% or 2.5% in the juice.

A series of flasks without additives served as controls.

After 7 days' storage at room temperature (25° C.) the juices which contained 1% of sodium polyphosphates ($N_{ave}$ 18–35) or of 2.5% of sodium polyphosphates ($N_{ave}$ 9–35) were well preserved without any signs of spoilage by yeasts or molds.

The controls stored under the same conditions (7 days 25° C.) showed yeast fermentation or heavy growth of molds.

EXAMPLE 10

Orange juice was pressed out of over-ripe already mushy oranges.

By using oranges which were starting to spoil, it was assured that spoilage microorganisms were present in the juice.

Portions of this juice were filled into a series of flasks, and different polyphosphates were added to these flasks in quantities to give 1% or 2% in the juice.

After 7 days of storage at 25° C. all the controls which contained no polyphosphates were spoiled by yeast fermentation, and mold growth, whereas 1% or 2% of sodium hexametaphosphate or sodium polyphosphate $N_{ave}$ 15, 18, 20, 31 or 35 had preserved the orange juice.

EXAMPLE 11

The growth of different molds were studied on a liquid malt medium. This medium contained 1.5% malt extract, 3.0% corn sugar, 0.3% yeast extract, and 0.2% peptone. Portions of this medium were filled into flasks to which different polyphosphates were added to a final concentration of 2.5% in the liquid broth.

All the flasks were then inoculated with suspensions of spores of the following molds:

(a) *Aspergillus flavus*
(b) *Penicillium italicum*
(c) *Aspergillus niger*
(d) a yellow mold isolated from oranges The additives were:

Potassium tripolyphosphate
Sodium hexametaphosphate ($N_{ave}$ 11)
Sodium polyphosphate ($N_{ave}$ 18)
Sodium polyphosphate ($N_{ave}$ 20)
Sodium polyphosphate ($N_{ave}$ 31)
Sodium polyphosphate ($N_{ave}$ 35)

A series of flasks with sodium chloride as an additive and one series without additives served as controls.

The flasks were incubated at 30° C. After 3 days heavy mold growth was observed in all controls having been inoculated with the four different molds. The mold *Aspergillus flavus* grew also in the flasks with potassium tripolyphosphate.

The sodium polyphosphates, with average chain lengths 11 through 35, completely preserved the malt medium which comprised an ideal medium for the growth of molds for 3 weeks.

A similar test as described with molds was performed with yeast, *Saccharomyces cerevisiae.*

Yeast was added at a concentration to give 50,000 cells per ml. in the malt medium.

Whereas the control showed heavy fermentation and yeast growth after 3 days, in the flasks with sodium polyphosphate, yeast did not grow and the medium stayed clear and unchanged for the whole time of the experiment up to 3 weeks.

EXAMPLE 12

Sodium polyphosphates gave synergistic effects of fungistatic activity when used together with propionate or benzoate.

A series of flasks was prepared containing 1.5% malt extract and 3% dextrose in solution. Sodium polyphosphates and the two above mentioned preservatives were added to these flasks, alone and in combinations.

Then all flasks were inoculated with portions of a suspension of yeast cells. The calculated concentration of yeast cells in the broth was $3\times10^5$ cells/ml.

Incubation was then carried out at 30° C. for 20 hours. After this time turbidity readings were taken. The turbidty obtained in the controls which had no chemical additive, was taken as 100%, clear broth gave 0%.

Growth of yeast in percent

| | Percent |
|---|---|
| 1% sodium hexametaphosphate | 13 |
| 1% sodium polyphosphate (av. chain length 35) | 10 |
| 0.1% Na-propionate | 80 |
| 1% Na-propionate | 58 |
| 1% Na-propionate | 39 |
| 0.05% Na-propionate+0.5% sodium hexametaphosphate | 5 |
| 0.05% Na-propionate+0.5% sodium metaphosphate | 3 |
| 0.25% Na-propionate+0.05% sodium metaphosphate | 1 |
| 0.05% methyl-p-hydroxy benzoate | 70 |
| 0.025% methyl-p-hydroxy benzoate+0.5 sodium metaphosphate | 2 |

EXAMPLE 14

The following data presented in Table III illustrates the unexpected, enhanced bacteriocidal effect of polyphosphates ($N_{ave}$ 16–34) as compared with lower polyphosphates ($N_{ave}$ up to 12) and high polyphosphates against the gram positive, *Staphylococcus aureus* when applied at the 1% level. The initial bacteriological population in the nutrient broth was $6\times10^6$ per ml. and the temperature was maintained at 37° C. under atmospheric pressure. The pH of each solution was maintained the same at about 6–7 except for the sodium tripolyphosphate solution which had a pH about 8–9. The phosphate additive concentration was 1% in each solution in Table III.

TABLE III

| Phosphate additive | Turbidity (measure of growth) | Bacterial count per ml. (by plating) after— | | | Percent bacteria surviving after— | | |
|---|---|---|---|---|---|---|---|
| | | 24 hrs. | 5 days | 10 days | 24 hrs. | 5 days | 10 days |
| $Na_2HPO_4+KH_2PO_4$ | Heavy turbid | Est. $10^{8+}$ | $10^{8+}$ | $10^{8+}$ | 100+ | 100+ | 100+ |
| Sodium acid pyrophosphate plus tetra sodium pyrophosphate | Turbid | $2\times10^6$ | $10^{8+}$ | $10^{8+}$ | 30 | 100+ | 100+ |
| Sodium tripolyphosphate | Clear | $2\times10^5$ | $2\times10^3$ | 50 | 3 | 0.03 | 0.001 |
| Sodium polyphosphate, ave. chain length: | | | | | | | |
| $N_{ave}$ 12 | do | $10^5$ | 20 | 20 | 2 | 0.0003 | 0.0003 |
| $N_{ave}$ 16 | do | $4\times10^3$ | 0 | 0 | 0.06 | 0 | 0 |
| $N_{ave}$ 18 | do | $4\times10^3$ | 0 | 0 | 0.06 | 0 | 0 |
| $N_{ave}$ 34 | do | $2\times10^3$ | 0 | 0 | 0.03 | 0 | 0 |
| $N_{ave}$ 37 | do | $2\times10^3$ | 100 | 40 | 0.03 | 0.002 | 0.001 |
| NaCl (Control) | Heavy turbid | $10^8$ | $10^8$ | $10^8$ | 100 | 100 | 100 |

EXAMPLE 13

The data presented by way of the following table illustrate an increase in fungicidal activity observed in regard to polyphosphates of increasing chain lengths against *Saccharomyces cerevisiae.*

TABLE II

*Saccharomyces cerevisiae*

[Yeast in apple juice, after 12 days]

| Additive | Initial conventration of— | | | |
|---|---|---|---|---|
| | 60,000 yeast cells per ml. | 6,000 yeast cells per ml. | 600 yeast cells per ml. | 60 yeast cells per ml |
| 11% sodium hexameta phosphate ($N_{ave}$ 12) | *** | ** | * | * |
| f% Na-metaphosphate ($N_{ave}$ 16) | ** | ** | * | O |
| 1% Na-metaphosphate ($N_{ave}$ 18) | ** | * | * | O |
| 1% Na-metaphosphate ($N_{ave}$ 33) | * | * | O | O |
| 1% Na-metaphosphate ($N_{ave}$ 37) | * | O | O | O |
| 1% K-polymeta-phos. in Vitrafos [1] | O | O | O | O |
| 1% NaCl | *** | *** | *** | *** |
| No additive | *** | *** | *** | *** |

[1] Trademark for a clear, glassy, granular sodium phosphate, 67% minimum phosphorus pentoxide.

NOTE.—O=No fermentation; *=Light fermentation; =Medium fermentation; *=Heavy fermentation.

When sodium tripolyphosphate is compared at a pH 6–7 in a nutrient broth under the conditions of Example 14, the approximate percent bacteria which survive after 24 hours is about 20% as compared with 3% at a pH of 8–9. Thus, the lower polyphosphate anions, e.g., the tripolyphosphate anion, is significantly less effective against bacteriological organisms than the phosphates having an average chain length between 14 and 37.

EXAMPLE 15

The following data presented in Table IV below illustrates the unexpected effectiveness of the polyphosphate anion (average chain length 16–34) against gram negative bacteria, viz., *Escherichia coli.* The percentage growth is shown for various initial populations after an incubation period of 76 hours from treatment. The temperature was maintained at 37° C. under atmospheric pressure; and the initial bacteriological population is as shown in the table. The pH of each solution was maintained the same at about 6–7 except in the tripolyphosphate solution which had a pH about 8–9.

TABLE IV

| Phosphate additive | Amount of additive, percent | Percent growth with— | | |
|---|---|---|---|---|
| | | Initial bact. population 80 per ml. | Initial bact. population 800 per ml. | Initial bact. population 8,000 per ml. |
| $Na_2HPO_4+KH_2PO_4$ | 1 | 100+ | 100+ | 100+ |
| Sodium acid pyrophosphate plus tetrasodium pyrophosphate | 1 | 40 | 40 | 39 |
| Sodium tripolyphosphate | 1 | 1 | 1 | 3 |
| Sodium polyphosphate, chain length: | | | | |
| $N_{ave}$ 12 | 1 | 21 | 29 | 33 |
| $N_{ave}$ 16 | 1 | 19 | 28 | 32 |
| $N_{ave}$ 18 | 1 | 1 | 1 | 4 |
| $N_{ave}$ 34 | 1 | 25 | 35 | 32 |
| $N_{ave}$ 37 | 1 | 37 | 37 | 37 |
| Potassium polyphosphate in 2% Vitrafos [1] 1000+ | 0.5 | 36 | 41 | 40 |
| Potassium polyphosphate (1000+) in 1% Vitrafos [1] | 0.5 | 29 | 36 | 46 |
| Potassium polyphosphate (1000+) in 0.5% Vitrafos [1] | 0.5 | 70 | 70 | 73 |
| NaCl (control) | 1 | 85 | 85 | 85 |
| No additive | | 100 | 100 | 100 |

[1] Trademark for a clear, glassy, granular sodium phosphate, 67% minimum phosphorus pentoxide.

Alkali metal polyphosphates of medium chain length (average chain lengths 16–34) were also tested and found highly effective against *Streptococcus faecalis, Pseudomonas fluorescens, Salmonella typhimurium, Salmonella senftenberg,* Achromobacter, and *Clostridium sporogenes,* In the practice of the present invention it has been found that the sodium polyphosphates are more effective as antibacteriological agents than potassium polyphosphates and that the medium chain length polyphosphates are most effective against gram positive bacteria.

EXAMPLE 16

Test media containing egg whites were inoculated with *Staphylococcus aureus* in initial microbial populations of $10^3$ per ml. and then treated by incorporation of 1% polyphosphates of various chain lengths between 3 and 1000+. An incubation period of three days at 37° C. was permitted. The most effective polyphosphate was found to be sodium polyphosphate having an average chain length of about 18. It was noted that the bacterial population was decreased employing sodium polyphosphate ($N_{ave}$ 18) during the incubation period.

EXAMPLE 17

Test media containing ground fish fillet were inoculated with *Staphylococcus aureus* and tested in the same manner as in Example 16. Sodium polyphosphate (average chain length about 18) was found to be the most effective on this case. It was noted that no bacteriological propagation occured in the sample containing sodium polyphosphate ($N_{ave}$ 18) during the incubation period.

EXAMPLE 18

Test media containing beef broth were inoculated with *Staphylococcus aureus* under the conditions and with the results shown in Table V following.

TABLE V

| Test medium | Beef broth | Beef broth |
|---|---|---|
| Initial microbial concentration. | $6\times10^5$/ml | $6\times10^6$/ml. |
| Incubation conditions | 37° C., 7 days | 37° C., 10 days. |
| Level of polyphosphate | 1% | 0.5%. |
| Most effective polyphosphate to control growth. | Sodium polyphosphate ave. chain length 16 or 18. | Sodium polyphosphate ave. chain length 30. |
| Remarks | All bacteria killed, good growth with potassium polyphosphate (1000+). | 0.0001% recovered. |

EXAMPLE 19

Test media were inoculated with *Pseudomonas fluorescens* under the conditions and with the results shown in Table VI below.

TABLE VI

| Test medium | Beef broth | Beef broth |
|---|---|---|
| Initial microbial population. | $4\times10^4$/ml | $4\times10^2$/ml. |
| Incubation conditions | 37° C., 5 days | 37° C., 10 days. |
| Level of polyphosphate | 1% | 1%. |
| Most effective polyphosphate to control growth. | Sodium polyphosphate ave. chain length 16 or 18. | Sodium polyphosphate ave. chain length 18. |
| Remarks | No turbidity in broth | All bacteria killed. |

Additional experiments carried out with polyphosphates having average chain lengths up to 78 show that the polyphosphates of high average chain lengths exhibit a decline in bactericidal activity.

Based on experience derived from conducting initial Experiments 1 through 19, the additional, more quantitative experiments hereinafter set forth were carried out. These additional experiments are considered to present a more highly reliable indication of the true effects of the medium chain length polyphosphates under service conditions.

EXAMPLE 20

This example is presented in tabular form below. It illustrates extended retardation of spoilage by medium chain length polyphosphates.

TABLE VII

[Test medium: Malt extract; Microorganisms tested: *Aspergillus flavus*, initial concentration spores of mold $3\times10^3$ per ml.]

| Additive | Concn. of add., percent | Storage temp., ° C. | Observation of results, growth after— 2 days | 5 days | 7 days | 12 days |
|---|---|---|---|---|---|---|
| $Na_2HPO_4$ | 1 | 30 | * | * | * | * |
| $Na_2H_2P_2O_7$ | 1 | 30 | * | * | * | * |
| $Na_4P_2O_7$ | 1 | 30 | * | * | * | * |
| $Na_5P_3O_{10}$ | 1 | 30 | No growth | * | * | * |
| $Na_6P_4O_{13}$ | 1 | 30 | do | O | * | * |
| $(NaPO_3)$ $N_{ave}$ 12 | 1 | 30 | do | O | * | * |
| $(NaPO_3)$ $N_{ave}$ 14 | 1 | 30 | do | * | * | * |
| $(NaPO_3)$ $N_{ave}$ 16 | 1 | 30 | do | No growth | O | * |
| $(NaPO_3)$ $N_{ave}$ 17 | 1 | 30 | do | do | * | * |
| $(NaPO_3)$ $N_{ave}$ 18 | 1 | 30 | do | do | O | * |
| $(NaPO_3)$ $N_{ave}$ 23 | 1 | 30 | do | do | O | * |
| $(NaPO_3)$ $N_{ave}$ 25 | 1 | 30 | do | do | O | * |
| $(NaPO_3)$ $N_{ave}$ 30 | 1 | 30 | do | do | O | * |
| $(NaPO_3)$ $N_{ave}$ 33 | 1 | 30 | do | do | * | * |
| $(NaPO_3)$ $N_{ave}$ 37 | 1 | 30 | do | do | * | * |
| $(NaPO_3)$ $N_{ave}$ 43 | 1 | 30 | do | do | O | * |
| $(NaPO_3)$ $N_{ave}$ 62 | 1 | 30 | do | do | O | * |
| $(NaPO_3)$ $N_{ave}$ 78 | 1 | 30 | do | do | O | * |
| $(KPO_3)$ ca. 1,000 in $(NaPO_3)_{12}$ | 1 | 30 | do | * | * | * |
| $(KPO_3)$ ca. 1,700 in $(NaPO_3)_{12}$ | 1 | 30 | do | * | * | * |
| Control | 0 | 30 | * | * | * | * |

NOTE.—*=Mold growth visible; O=Clear, no growth.

EXAMPLE 21.—TABLE VIII

[Test medium: Malt extract; Microorganisms tested: Yeast, initial concn. $6\times10^3$ per ml.]

| Additive | Concn. percent | Stor. ° C. | Results: Turbidity after— 4 days | 12 days | 19 days | Yeast count after 19 days, per ml. |
|---|---|---|---|---|---|---|
| $Na_2HPO_4$ | 1 | 30 | Turbid | Turbid | Turbid | $>10^7$ |
| $Na_2H_2P_2O_7$ | 1 | 30 | do | do | do | $>10^7$ |
| $Na_4P_2O_7$ | 1 | 30 | do | do | do | $4.8\times10^3$ |
| $Na_5P_3O_{10}$ | 1 | 30 | Clear | Clear | Clear | <100 |
| $Na_6P_4O_{13}$ | 1 | 30 | do | do | do | <100 |
| $(NaPO_3)$ $N_{ave}$ 12 | 1 | 30 | do | do | do | <100 |
| $(NaPO_3)$ $N_{ave}$ 14 | 1 | 30 | do | do | do | <100 |
| $(NaPO_3)$ $N_{ave}$ 16 | 1 | 30 | do | do | do | <100 |

TABLE VIII—Continued

| Additive | Concn. percent | Stor. ° C. | Results: Turbidity after— 4 days | 12 days | 19 days | Yeast count after 19 days, per ml. |
|---|---|---|---|---|---|---|
| $(NaPO_3)$ $N_{ave}$ 17 | 1 | 30 | Clear | Clear | Clear | <1 |
| $(NaPO_3)$ $N_{ave}$ 18 | 1 | 30 | do | do | do | <100 |
| $(NaPO_3)$ $N_{ave}$ 23 | 1 | 30 | do | do | do | <100 |
| $(NaPO_3)$ $N_{ave}$ 25 | 1 | 30 | do | do | do | <1 |
| $(NaPO_3)$ $N_{ave}$ 30 | 1 | 30 | do | do | do | <1 |
| $(NaPO_3)$ $N_{ave}$ 33 | 1 | 30 | do | do | do | <1 |
| $(NaPO_3)$ $N_{ave}$ 37 | 1 | 30 | do | do | do | <1 |
| $(NaPO_3)$ $N_{ave}$ 43 | 1 | 30 | do | do | do | <1 |
| $(NaPO_3)$ $N_{ave}$ 62 | 1 | 30 | do | do | do | <100 |
| $(NaPO_3)$ $N_{ave}$ 78 | 1 | 30 | do | do | do | <1 |
| $(KPO_3)$ ca. 1,000 in $(NaPO_3)_{12}$ | 1 | 30 | do | do | do | <100 |
| $(KPO_3)$ ca. 1,700 in $(NaPO_3)_{12}$ | 1 | 30 | do | do | do | <100 |
| Control | 0 | 30 | Turbid | Turbid | Turbid | $5.8\times10^7$ |

EXAMPLE 22.—TABLE IX

[Test medium: Malt extract (1.5%) and dextrose (3%); Microorganisms tested: *Aspergillus flavus, Penicill. italic., Asp. niger*, Yeast]

| Additive | Concn. of add., percent | Stor. temp., ° C. | Results after 30 days: *Asper. flavus* | *Penicill. italic.* | *Asper. niger* | Yeast |
|---|---|---|---|---|---|---|
| $K_5P_3O_{10}$ | 2.5 | 25 | Very heavygrowth | Slight growth | Slight growth | Very heavy growth. |
| $(NaPO_3)$ $N_{ave}$ 12 | 2.5 | 25 | Growth | Trace growth | Trace growth | Heavy growth. |
| $(NaPO_3)$ $N_{ave}$ 14 | 2.5 | 25 | do | do | do | No growth. |
| $(NaPO_3)$ $N_{ave}$ 16 | 2.5 | 25 | do | do | do | Do. |
| $(NaPO_3)$ $N_{ave}$ 18 | 2.5 | 25 | Slight growth | No growth | do | Do. |
| $(NaPO_3)$ $N_{ave}$ 33 | 2.5 | 25 | Trace growth | Trace growth | No growth | Do. |
| $(NaPO_3)$ $N_{ave}$ 37 | 2.5 | 25 | No growth | do | do | Do. |
| Control | 0 | 25 | Very heavy growth | Very heavy growth | Very heavy growth | Very heavy growth. |

EXAMPLE 23.—TABLE X

[Test medium: Apple juice; Microorganisms tested: Yeast, mold (Samples kept open exposed to air, not inoculated)]

| Additive | Concn. of add. percent | Stor. temp. ° C. | Results: 12 days | 45 days |
|---|---|---|---|---|
| $Na_5P_3O_{10}$ | .5 | 25 | Fermented, moldy. | Fermented, moldy. |
| $K_5P_3O_{10}$ | 1 | 25 | do | Do. |
| $(NaPO_3)$ $N_{ave}$ 12 | .5 | 25 | Fermented | Fermented, moldy. |
| | 1 | 25 | Preserved | Fermented. |
| $(NaPO_3)$ $N_{ave}$ 14 | .5 | 25 | do | Preserved. |
| | 1 | 25 | do | Do. |
| $(NaPO_3)$ $N_{ave}$ 16 | .5 | 25 | Preserved | Fermented. |
| | 1 | 25 | do | Do. |
| $(NaPO_3)$ $N_{ave}$ 18 | .5 | 25 | Preserved | Preserved. |
| | 1 | 25 | do | Do. |
| $(NaPO_3)$ $N_{ave}$ 33 | .5 | 25 | Preserved | Preserved. |
| | 1 | 25 | do | Do. |
| $(NaPO_3)$ $N_{ave}$ 37 | .5 | 25 | Preserved | Preserved. |
| | 1 | 25 | do | Do. |
| Control | 0 | 25 | Fermented, moldy. | Fermented, moldy. |

EXAMPLE 25.—TABLE XII

Test medium: Pineapple juice and grape juice; Microorganisms tested: Natural yeasts and molds

| Additive | Concn. of add., percent | Stor. temp. ° C. | Results after 7 days: Pineapple juice, exposed to air | Grape juice, pressed in laboratory |
|---|---|---|---|---|
| $Na_2HPO_4$ | 1 | 25 | Moldy | Spoiled. |
| $Na_2H_2P_2O_7$ | 1 | 25 | do | Do. |
| $Na_4P_2O_7$ | .5 | 25 | do | Do. |
| $K_4P_2O_7$ | .5 | 25 | Preserved | Do. |
| $Na_5P_3O_{10}$ | 1 | 25 | Moldy | Do. |
| $K_5P_3O_{10}$ | 2.5 | 25 | do | Do. |
| $Na_6P_4O_{13}$ | 1 | 25 | do | Do. |
| $(NaPO_3)$ $N_{ave}$ 12 | 1 | 25 | Moldy | Spoiled. |
| | 2.5 | 25 | Preserved | Do. |
| $(NaPO_3)$ $N_{ave}$ 14 | 1 | 25 | do | Spoiled. |
| | 2.5 | 25 | do | Do. |
| $(NaPO_3)$ $N_{ave}$ 16 | 1 | 25 | Preserved | Spoiled. |
| | 2.5 | 25 | do | Preserved. |
| $(NaPO_3)$ $N_{ave}$ 18 | 1 | 25 | Preserved | Spoiled. |
| | 2.5 | 25 | do | Do. |
| $(NaPO_3)$ $N_{ave}$ 33 | 1 | 25 | Preserved | Spoiled. |
| | 2.5 | 25 | do | Preserved. |
| $(NaPO_3)$ $N_{ave}$ 37 | 1 | 25 | Preserved | Spoiled. |
| | 2.5 | 25 | do | Preserved. |
| Control | 0 | 25 | Moldy | Spoiled. |

EXAMPLE 24.—TABLE XI

[Test medium: Orange juice, pH 4.10; Microorganisms tested: Natural yeast, not inoculated

| Additive | Concn. of add., percent | Stor. temp., ° C. | Results: 2 days | 14 days | 30 days |
|---|---|---|---|---|---|
| $Na_5P_3O_{10}$ | 2 | 25 | Preserved | Spoiled | Spoiled. |
| | 1 | 25 | Spoiled | do | Do. |
| $(NaPO_3)N_{ave}$ 12 | 2 | 25 | Preserved | Spoiled | Spoiled. |
| | 1 | 25 | Spoiled | do | Do. |
| $(NaPO_3)N_{ave}$ 14 | 2 | 25 | Preserved | Spoiled | Spoiled. |
| | 1 | 25 | do | do | Do. |
| $(NaPO_3)N_{ave}$ 18 | 2 | 25 | Perserved | Preserved | Preserved. |
| | 1 | 25 | do | do | Do. |
| $(NaPO_3)N_{ave}$ 33 | 2 | 25 | Preserved | Preserved | Preserved. |
| | 1 | 25 | do | do | Do. |
| Control | 0 | 25 | Spoiled | Spoiled | Spoiled. |

EXAMPLE 26

A comparison was made of sodium hexametaphosphate (SHMP) and sodium polyphosphate with average chain length 25 (NaMP–25) as preservatives for apple cider. The effectiveness of SHMP–12 and NaMP–25 to inhibit the growth of yeast was tested in a storage experiment. SHMP and NaMP–25 were compared against each other, against mixtures with benzoate, and against benzoate or sorbate alone.

The test conditions were as follows. Apple cider with an initial yeast count of $1.6 \times 10^5$ per ml., pH 3.6, was stored in closed bottles at a controlled temperature of 68° F. for 3 weeks. Samples were drawn on every working day, and plated to determine the yeast count. Evaluation involved daily microbiological analysis of five replicates for each additive system.

The various additives included phosphates at the 1% level, benzoate or sorbate at 0.1% and mixtures of half phosphate and half benzoate. This experimental design led to the following additive systems:

(1) 1% SHMP
(2) 1% NaMP–25
(3) 0.5% SHMP plus 0.05% benzoate
(4) 0.5% NaMP–25 plus 0.05% benzoate
(5) 0.1% benzoate
(6) 0.1% sorbate
(7) Control, no additive The yeast counts after storage were determined by plating and are listed in Table XIII. This table allowed a comparison of two phosphates of different chain length, between each other, and against other preservatives. The effects of polyphosphates upon the yeast count in cider were characterized by a significant decrease in the number of yeast cells for three days with sodium hexametaphosphate and for eight days with added sodium polyphosphate of an average chain length of 25. A significant increase of the count of yeast cells in apple cider was considered a symptom of spoilage. The initial yeast count was surpassed significantly in apple cider without any additive after 1 day, in apple cider with 1% SHMP after 7 days, with 0.1% potassium sorbate after 11 days, with 1% NaMP–25 after 13 days, with a mixture of 0.5% SHMP and 0.05% sodium benzoate after 18 days.

apple cider which was thawed the day of the test. The taste panel members rated the samples according to the following descriptive terms:

| | Assigned numerical value |
|---|---|
| Better than reference | 5 |
| Equal to reference | 4 |
| Slightly less desirable | 3 |
| Much less desirable | 2 |
| Completely undesirable | 1 |

Numerical values were assigned to the descriptions, in order to facilitate statistical analysis of the data.

The taste scores gathered on each sampling day varied somewhat. However, when weekly averages were taken, a definite trend could be established. The weekly averaged taste scores allowed a valid comparison of benzoate or sorbate versus mixtures of these preservatives with NaMP–25.

TABLE XIV

Average Taste Scores of Apple Cider

| Additive | 1st week | 2nd week | 3rd week | 4th week | 5th week |
|---|---|---|---|---|---|
| 0.1% Na-benzoate | 2.83 | 2.58 | 2.82 | 2.51 | 2.26 |
| 0.05% Na-bonzoate plus 0.5% NaMP-25 | 3.20 | 2.98 | 2.84 | 2.77 | 2.43 |
| 0.1% K-sorbate | 2.55 | 2.58 | 2.52 | 2.06 | 1.90 |
| 0.05% K-sorbate plus 0.5% NaMP-25 | 3.21 | 3.00 | 3.17 | 2.84 | 2.63 |

The higher values for each week and thus the preferred preservative systems were given by the combinations of sodium polyphosphate ($N_{ave}$–25) with either sodium benzoate or potassium sorbate.

What is claimed is:

1. The method of preserving food materials from spoilage caused by the growth of fungi or bacteria which comprises incorporating in such a food material between about 0.1 and about 5 percent on a weight basis of the food material a polyphosphate of the type:

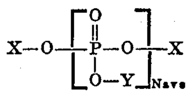

wherein X is selected from the group consisting of hydrogen and alkali metal; Y represents alkali metal; and $N_{ave}$ represents an average chain length of between about 16 and 37.

2. The method of claim 1 in which X is hydrogen.

3. The method of claim 1 in which X is an alkali metal.

4. The method of claim 3 in which said alkali metal is sodium.

5. The method of claim 3 in which said alkali metal is potassium.

TABLE XIII

[Preservation of Apple Cider at 68°F. (1–18 days of storage)]

| | Yeast count per milliliter (Initial concentration $1.6 \times 10^5$ cells per milliliter) all numbers are times $10^5$ | | | | | | | | | | | | | | | | | |
|---|---|---|---|---|---|---|---|---|---|---|---|---|---|---|---|---|---|---|
| Days of storage | 1 | 2 | 3 | 4 | 5 | 6 | 7 | 8 | 9 | 10 | 11 | 12 | 13 | 14 | 15 | 16 | 17 | 18 |
| Additive (percent by weight): | | | | | | | | | | | | | | | | | | |
| 1% sodium hexa-meta-phosphate (SHMP) | 1.1 | 0.8 | 0.42 | 0.67 | 1.1 | (1.9) | 3.4 | 9.0 | 25.0 | ——— | ——— | ——— | ——— | Spoiled | ——— | ——— | ——— | ——— |
| 1%sodium meta-phosphate 25 chain length (NaMP–25) | 0.69 | 0.51 | 0.24 | 0.06 | 0.035 | (0.019) | 0.011 | 0.006 | 0.02 | 0.03 | 0.75 | (2.2) | (5.4) | 14.0 | 35.0 | (50.0) | 63.0 | (82.0) |
| 0.5% SHMP, 0.25% sodium benzoate | 1.5 | 1.4 | 1.3 | 1.2 | 1.1 | (0.94) | 0.8 | 0.76 | 0.72 | 0.7 | 0.65 | (0.6) | (0.58) | (0.53) | 0.5 | 1.3 | (2.8) | 5.2 |
| 0.5% NaMP–25, 0.05% sodium benzoate | 1.5 | 1.4 | 1.3 | 1.2 | 1.1 | (0.92) | 0.73 | 0.7 | 0.54 | 0.54 | 0.44 | (0.36) | (0.31) | (0.26) | 0.23 | 0.19 | 0.32 | 0.42 |
| 0.1% sodium benzoate | 1.5 | 1.4 | 1.2 | 1.0 | 0.81 | (0.67) | 0.54 | 0.40 | 0.36 | 0.32 | 0.32 | (0.27) | (0.22) | (0.18) | 0.15 | 0.1 | (0.065) | 0.044 |
| 0.1% potassium sorbate | 1.7 | 1.7 | 1.6 | 1.55 | 1.5 | (1.45) | 1.4 | 1.4 | 1.45 | 1.5 | 3.4 | (3.45) | (3.6) | 3.8 | (3.95) | (4.05) | (4.1) | 4.4 |
| Control 0% additive | 4.8 | 64.0 | | | | | | | | | Spoiled | | | | | | | |

NOTE.—Numbers in parentheses are graphical approximations.

EXAMPLE 27

Taste preferences were evaluated in samples of stored apple cider. Samples of apple cider were preserved by various additive systems and tested for the consumer acceptance by taste panel analysis.

The results of the taste panel analysis were as follows. Taste panels compared the flavor of apple cider samples containing preservatives with a reference sample which contained no additive. The reference sample was frozen 6. The method of claim 3 in which said alkali metal is ammonium.

7. The method of claim 1 in which Y is sodium.

8. The method of claim 1 in which Y is potassium.

9. The method of claim 1 in which said food material comprises a juice of a fruit or vegetable or fermented derivative thereof.

10. The method of claim 1 in which said food material comprises animal or vegetable broths or extracts.

11. The method of claim 9 in which said food material is the juice of the apple.

12. The method of preserving fruit or vegetable juice against microbial spoilage which comprises incorporating in such fruit or vegetable juice a polyphosphate of the type:

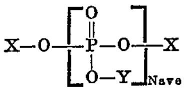

wherein X is selected from the group consisting of hydrogen and alkali metal; Y represents alkali metal; and $N_{ave}$ represents an average chain length of between about 16 and about 100, and an alkali metal benzoate, sorbate, or propionate, said polyphosphate and alkali metal benzoate sorbate, or propionate being present in a combined concentration of between about 0.2 and about 2 percent on a weight basis of the food material.

13. The preserved food product of the method of claim 1.

14. The preserved apple juice of the method of claim 11.

15. The preserved food material of claim 12.

16. A composition of matter useful for preserving food materials from microbial spoilage which comprises a polyphosphate of the type:

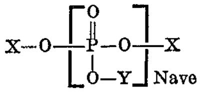

wherein X is selected from the group consisting of hydrogen and alkali metal; Y represents alkali metal; and $N_{ave}$ represents an average chain length of between about 16 and about 100, and an alkali metal benzoate, sorbate, or propionate, the ratio of polyphosphate to alkali metal benzoate, sorbate, or propionate being between about 1:20 and 20:1.

17. The composition of claim 16 in which the ratio of polyphosphate to alkali metal benzoate, sorbate or propionate is between about 2:1 to 1:2.

References Cited

UNITED STATES PATENTS

| | | | |
|---|---|---|---|
| 3,130,002 | 4/1964 | Fuchs | 21—2.7 |
| 3,104,170 | 9/1963 | Mahon | 99—157 X |
| 3,118,777 | 1/1964 | Lauck et al. | 99—222 |
| 3,404,987 | 10/1968 | Koolstra et al. | 99—150 |

HYMAN LORD, Primary Examiner

U.S. Cl. X.R.

99—154, 155, 157, 158, 222, 224

PO-1050
(5/69)

UNITED STATES PATENT OFFICE
CERTIFICATE OF CORRECTION

Patent No. 3,681,091 Dated August 1, 1972

Inventor(s) Willibald F. Kohl and Rudolph H. Ellinger

It is certified that error appears in the above-identified patent and that said Letters Patent are hereby corrected as shown below:

Column 3, line 67, delete "anad" and insert in lieu thereof --and--. Column 5, line 7, delete "chemical" and insert in lieu thereof --chemicals--. Column 8, line 74, delete "bidty" and insert in lieu thereof --bidity--. Column 9, Example 12, Table on Growth of Yeast in Percent, 4th line down, delete "1%-Na-propionate" and insert in lieu thereof --0.5% Na-propionate; Column 9, same table, next to last line, after "o.5" insert --%--; Column 9, Example 13, Table II, first line of table, delete "11%" and insert in lieu thereof --1%--.

Signed and sealed this 30th day of January 1973.

(SEAL)
Attest:

EDWARD M.FLETCHER,JR.
Attesting Officer

ROBERT GOTTSCHALK
Commissioner of Patents